No. 662,967. Patented Dec. 4, 1900.
H. G. ROSE.
FOUNTAIN SPITTOON.
(Application filed Mar. 23, 1900.)

(No Model.) 2 Sheets—Sheet 1.

Witnesses: Harry Frease. J. A. Jeffers.

Inventor Horace G. Rose By F. W. Bond Attorney.

THE NORRIS PETERS CO., PHOTO-LITHO., WASHINGTON, D. C.

No. 662,967. Patented Dec. 4, 1900.
H. G. ROSE.
FOUNTAIN SPITTOON.
(Application filed Mar. 23, 1900.)
(No Model.) 2 Sheets—Sheet 2.

Witnesses:
Harry Frease.
J. A. Jeffers.

Inventor
Horace G. Rose
By F. W. Bond
Attorney.

THE NORRIS PETERS CO., PHOTO-LITHO., WASHINGTON, D. C.

UNITED STATES PATENT OFFICE.

HORACE G. ROSE, OF CANTON, OHIO, ASSIGNOR TO ANDREW M. McCARTY, ALBERT HOEFFER, AND ADAM C. McDOWELL, OF SAME PLACE.

FOUNTAIN-SPITTOON.

SPECIFICATION forming part of Letters Patent No. 662,967, dated December 4, 1900.

Application filed March 23, 1900. Serial No. 9,854. (No model.)

*To all whom it may concern:*

Be it known that I, HORACE G. ROSE, a citizen of the United States, residing at Canton, in the county of Stark and State of Ohio, have invented certain new and useful Improvements in Fountain-Spittoons; and I do hereby declare that the following is a full, clear, and exact description of the same, reference being had to the annexed drawings, making a part of this specification, and to the figures of reference marked thereon, in which—

Figure 1:
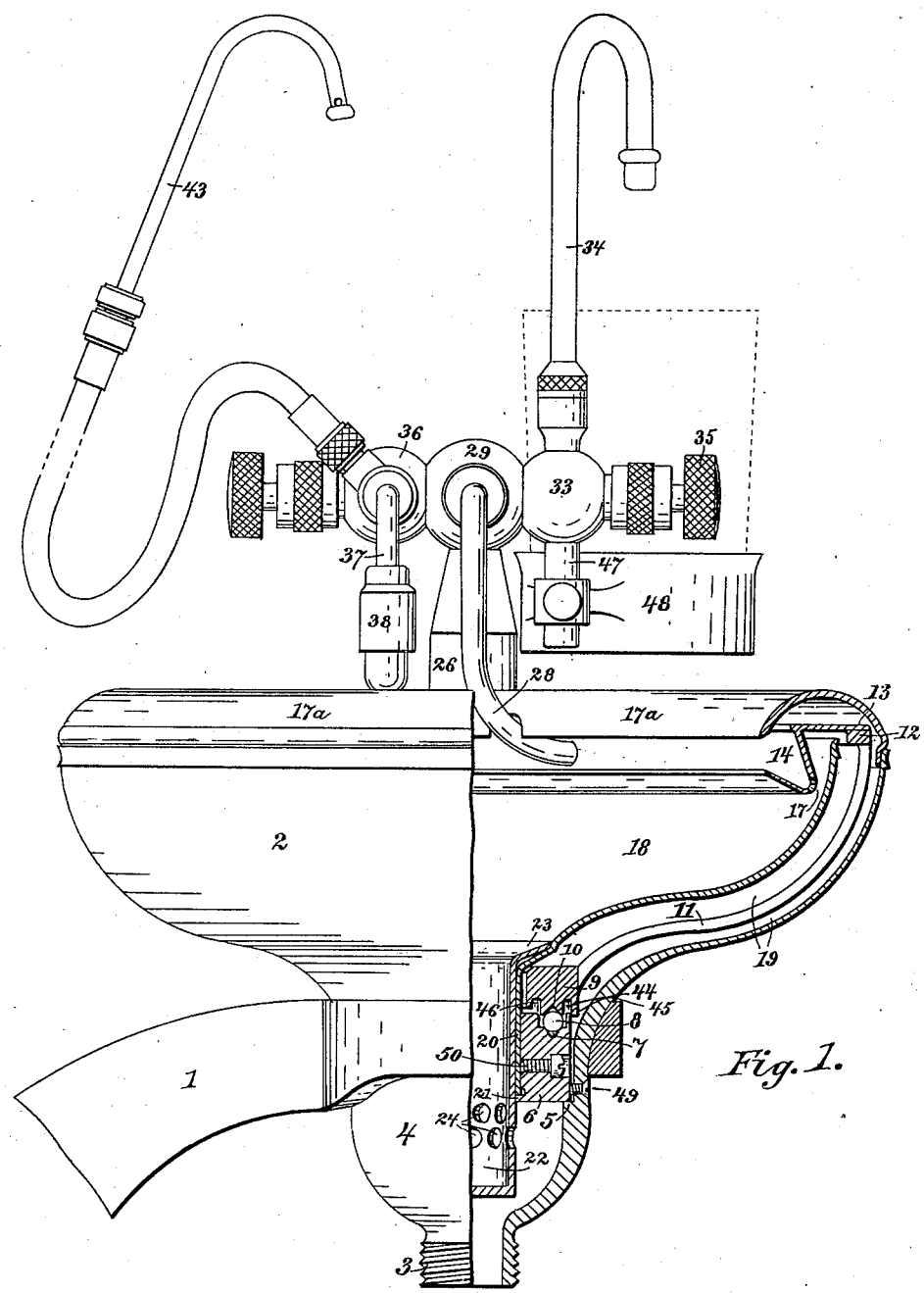
Figure 2:
Figure 3:
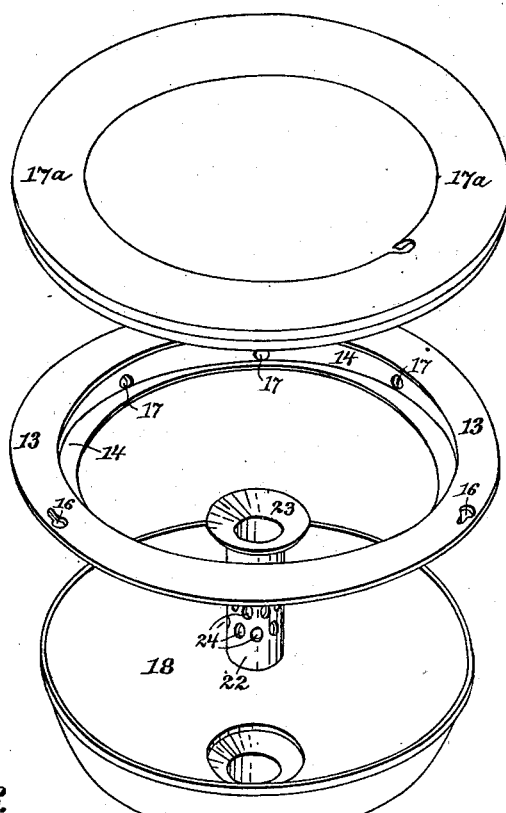
Figure 3:
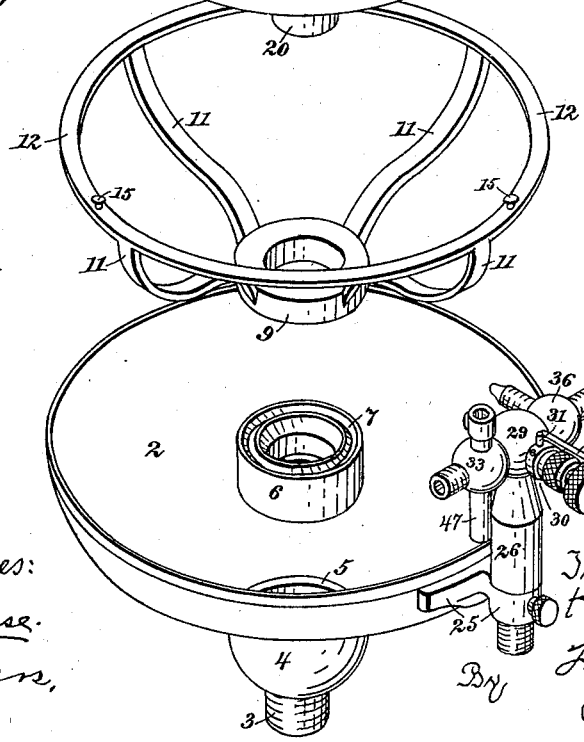

Figure 1 is an elevation of my invention, a portion of the right half being shown in section. Fig. 2 is a detached view of the muffled siphon-nozzle, showing part in sections. Fig. 3 is an isometric view of the several parts of the cuspidor or spittoon proper, all in line for assembling and showing the valve attachment.

The present invention has relation to spittoons more especially designed for dental purposes and may be connected to an operating-chair or it may be attached to any other desired object without departing from the nature of my invention.

Similar numerals of reference represent corresponding parts in all the figures of the drawings.

In the accompanying drawings, 1 represents a portion of the supporting-arm, which is to be provided with a suitable aperture to receive and hold the outer bowl and to support the different parts pertaining and belonging to the spittoon proper.

The arm 1 is to be attached to any desired object in any manner most convenient and proper to carry out the purposes contemplated. The outer bowl 2 may be substantially of the form shown and preferably is of such form; but it will be understood that the outer bowl 2 may be of any desired shape or size, having in mind the purposes hereinafter described.

The bowl 2 is preferably provided with the screw-threaded flange 3, said flange being for the purpose of providing a convenient means for connecting a waste-pipe.

The lower portion of the bowl 2 is formed with an extended portion 4, the inner periphery of which is provided with the shoulder or ledge 5, which ledge is preferably located a short distance above the flange 3 and is for the purpose of providing a support or rest for the supporting and ball-bearing block 6. The top or upper face of the block 6 is provided with the annular groove 7 to receive the antifriction-balls 8. Upon the balls 8 is located the hub 9, the bottom or under side of which is provided with the annular groove 10, said annular groove being located directly above the groove 7, said groove being for the purpose of receiving the upper portions of the balls 8, as illustrated in Fig. 1. From the hub 9 extend the arms 11, which arms are preferably bent or curved to correspond substantially with the curvature of the inner periphery of the outer bowl 2. To the top or upper ends of the arms 11 is connected the ring 12, or, if desired, said ring may be formed integral with the arms 11. Upon the top or upper face of the ring 12 is located the flange 13, said flange 13 being for the purpose of providing a support for the annular trough 14, which trough is preferably formed integral with the flange 13; but it may be made separate and connected in any convenient and well-known manner.

For the purpose of providing a means for connecting the flange 13 and its trough to the ring 12 said ring is provided with the headed studs 15, which headed studs are passed through the openings or eyes 16, formed in the flange 13, and said flange rotated a sufficient distance to bring the heads of the studs 15 over the reduced portions of the openings or eyes 16, by which arrangement a means is provided for removably connecting said parts together.

The trough 14 is provided with a series of apertures 17, located substantially, as shown and are for the purpose hereinafter described.

For the purpose of providing a suitable cover or casing the annular cover 17 is provided and may be of the form shown or it may be of any other desired form, reference being had to neatness and proper configuration.

The inner bowl 18 is substantially of the form shown in Fig. 3, and as shown its general outline corresponds substantially with that of the outer bowl 1, except that it is of less diameter and is so formed for the purpose of providing the space 19 between the outer periphery of said inner bowl and the inner periphery of the outer bowl 1, thereby providing room for the arms 11.

For the purpose of supporting the inner bowl 18 in proper relative position it is provided with the hollow stem or extension 20, which hollow stem or extension is extended through the hub 9 and into the block 6, substantially as illustrated in Fig. 1, the bottom or lower end of the hollow stem or extension 20 resting upon the flange 21 or its equivalent. Within the stem or extension 20 is normally located the cup 22, the top or upper end of which is provided with the flange 23, which flange is formed to correspond substantially with the form of the lower portion of the inner bowl 18, said flange being for the purpose of resting upon the inner bowl, substantially as illustrated in Fig. 1. At a short distance from the bottom or lower end of the cup 22 are located a series of apertures 24, which apertures are for the purpose of providing suitable drainage for the spittoon proper. The apertures 24 are located a short distance from the bottom or lower end of the cup, and the extreme bottom of said cup is closed, so that a means is provided for saving gold or other metals liable to find their way into the spittoon proper during the time dental operations are performed.

To the outer bowl 1 is connected or formed integral therewith the bracket 25, which bracket is for the purpose of receiving and holding the water-pipe 26. Upon the upper end of the water-pipe 26 are connected the various valve-chambers, which are provided with valves of ordinary construction, the main or inlet valve being opened and closed by means of the valve-wheel 27 or its equivalent. The main inlet-pipe 28 is located substantially as shown in Fig. 1 and extends downward and into the trough 14, by which arrangement a rotary motion is imparted to the trough, said trough being, as above described, supported by means of arms 11 and the hub 9, said hub rotating upon the balls 8, by which arrangement a light rotating device is provided, and by supporting the same upon antifriction-balls little resistance against rotation is offered. The main inlet-valve 29 is provided with the disk 30, which disk is provided with the stop-pin 31.

The valve-wheel 27 is provided with the arm 32, said arm being for the purpose of providing a stop for the valve-wheel 27.

The object and purpose of providing the arm 32 and the stop-pin 31 is to provide a means for regulating the force of water through the pipe 28.

It is well understood that various degrees of water-pressure are provided, and in order to compensate for the various degrees of water-pressure the valve 29 is opened a distance in proportion to the water force. For instance, at places where a low-water pressure is provided a greater quantity of water is required, and in case high-water pressure is provided a less quantity of water is required, and by providing the valve-wheel 27 with an arm designed to strike against a stop-pin the stop-pin may be adjusted at any desired point, by which arrangement the supply of water to the trough 14 can be easily regulated. To one side of the valve 29 is located the valve 33, which valve is provided with the spigot 34, said spigot being located and arranged substantially as shown in the drawings and is for the purpose of providing a means for the delivery of drinking-water or any other purpose.

It will be understood that the valve 33 is to be provided with an ordinary valve-wheel, such as 35.

The valve 36 may be located substantially as shown, from which valve leads the pipe 37, said pipe being provided with the muffled nozzle 38, said muffled nozzle being provided with the chamber 39, the lower portion of which is provided with suitable apertures 40, said apertures communicating with the chamber 41, which chamber is open at its upper end and communicates with the chamber 42, which chamber is open at its bottom or lower end, by which arrangement water is permitted to find its way from the nozzle proper and at the same time provide a suction by which the suction-tube 43 may be placed in the mouth of a patient for the purpose of removing by suction any liquid accumulations.

For the purpose of assisting in holding the hub 9 in proper relative position the bottom or lower side of said hub is provided with the flange 44, which flange overlaps a portion of the supporting-block 6, as illustrated in Fig. 1. For the purpose of allowing the hub to approach the fixed block 6, in the event that the antifriction-balls 8 become worn from long use, the chambers 45 and 46 are provided, which chambers are located substantially as shown in Fig. 1.

It will be understood that as the trough 14 is rotated the apertures 17 are passed under the tube 28, and as the water is received in the tube it will pass through said apertures, falling upon the inner periphery of the inner bowl, by which arrangement a series of streams following each other will be carried around with the rotation of the trough, by which arrangement the inner periphery of the inner bowl is at all times kept in a clean condition.

Below the valve 33 is extended a shank 47, to which shank is pivotally attached the vessel-holder 48, said vessel-holder being pivotally connected, so that it may be turned upon the shank 47.

For the purpose of preventing the block 6 from becoming accidentally displaced a set-screw, such as 49, may be provided, which set-screw is located substantially as shown in Fig. 1.

For the purpose of providing a means for removing the supporting-block 6, the rotating hub 9, together with the different parts connected thereto, and the inner bowl from the outer bowl the set-screw 50 is provided, which set-screw is seated against the hollow extension 20, as illustrated in Fig. 1.

It will be understood that the cup 22 can be easily removed from the inner bowl at any desired time without disturbing any of the parts belonging to the spittoon proper.

Having fully described my invention, what I claim as new, and desire to secure by Letters Patent, is—

1. In a spittoon of the class described, an inner and outer bowl spaced one from the other, an annular rotatable trough located within the inner bowl and provided with apertures and a supply-pipe for said rotatable trough, substantially as and for the purpose specified.

2. The combination of two bowls one located within the other, a supporting-block located within the lower portion of the outer bowl, a hub located and supported by the block, grooves or ways formed in the supporting block and hub, antifriction-balls located in said grooves or ways, arms extended from the hub, an annular trough carried by the arms and rotatable with the arms and hub, substantially as and for the purpose specified.

3. The combination of an outer and inner bowl, a hub, a support for the hub, arms extended upward from the hub between the outer and inner bowls and carrying a trough, said trough located within the inner bowl and provided with apertures, substantially as and for the purpose specified.

4. The combination of an inner and outer bowl, the inner bowl provided with a hollow extension, a removable cup suspended by the inner bowl and provided with a closed bottom and apertures formed in the cup above its closed bottom, substantially as and for the purpose specified.

5. The combination of an inner and outer bowl, a rotatable trough located within the inner bowl and provided with a flange, a ring means for rotatably supporting the same, said ring provided with headed studs, and eyes formed in the trough-flange to receive the headed studs, substantially as and for the purpose specified.

In testimony that I claim the above I have hereunto subscribed my name in the presence of two witnesses.

HORACE G. ROSE.

Witnesses:
M. M. DISLER,
ANNIE E. REILLEY.